United States Patent [19]

Halasa et al.

[11] Patent Number: 5,202,387

[45] Date of Patent: Apr. 13, 1993

[54] ELASTOMER WITH OUTSTANDING CHARACTERISTICS FOR USE IN MAKING TIRE TREAD COMPOUNDS

[75] Inventors: Adel F. Halasa, Bath; Wen-Liang Hsu, Copley, both of Ohio

[73] Assignee: The Goodyear Tire & Rubber Company, Akron, Ohio

[21] Appl. No.: 880,394

[22] Filed: May 8, 1992

[51] Int. Cl.$^5$ .................... C08F 4/08; C08F 279/02; C08F 297/04; C08L 53/02

[52] U.S. Cl. .................... 525/316; 525/271; 525/314; 525/315

[58] Field of Search ............ 525/314, 315, 316, 271

[56] References Cited

U.S. PATENT DOCUMENTS

| | | | |
|---|---|---|---|
| 4,782,119 | 11/1988 | Tsutsumi et al. | 525/314 |
| 4,908,401 | 3/1990 | Ohara et al. | 524/495 |
| 5,070,148 | 12/1991 | Hsu et al. | 525/316 |

*Primary Examiner*—Jacob Ziegler
*Attorney, Agent, or Firm*—Alvin T. Rockhill

[57] ABSTRACT

It is highly desirable for tire treads to exhibit good traction characteristics such as good wet skid resistance. However, it has traditionally been very difficult to improve the traction characteristics of a tire without sacrificing rolling resistance and tread wear. The high performance segmented elastomers of this invention offer a unique combination of desirable characteristics for utilization in making tire tread compositions. For instance, the rubbery polymers of this invention can be made into tire treads which exhibit outstanding traction characteristics while maintaining good rolling resistance and tread durability. This invention more specifically reveals a rubber polymer which has an excellent combination of properties for use in making tire treads which is comprised of (a) a first segment which consists essentially of repeat units which are derived from 1,3-butadiene monomer and styrene monomer, wherein the first segment has a vinyl content which is within the range of about 6% to about 15%, wherein the first segment has a number average molecular weight which is within the range of about 25,000 to about 350,000; and (b) a final segment which is comprised of repeat units which are derived from 1,3-butadiene and styrene, wherein the repeat units in the final segment are in essentially random order, wherein the final segment has a vinyl content of about 20% to about 95%, and wherein the final segment has a number average molecular weight which is within the range of about 25,000 to about 350,000.

15 Claims, No Drawings

ELASTOMER WITH OUTSTANDING CHARACTERISTICS FOR USE IN MAKING TIRE TREAD COMPOUNDS

BACKGROUND OF THE INVENTION

It is highly desirable for tires to exhibit good traction characteristics on both dry and wet surfaces. However, it has traditionally been very difficult to improve the traction characteristics of a tire without compromising its rolling resistance and tread wear. Low rolling resistance is important because good fuel economy is virtually always an important consideration. Good tread wear is also an important consideration because it is generally the most important factor which determines the life of the tire.

The traction, tread wear, and rolling resistance of a tire is dependent to a large extent on the dynamic viscoelastic properties of the elastomers utilized in making the tire tread. In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance various mixtures of styrene-butadiene rubber and polybutadiene rubber are commonly used as a rubber material for automobile tire treads. However, such blends are not totally satisfactory for all purposes.

Carbon black is generally included in rubber compositions which are employed in making tires and most other rubber articles. It is desirable to attain the best possible dispersion of the carbon black throughout the rubber to attain optimized properties. It is also highly desirable to improve the interaction between the carbon black and the rubber. By improving the affinity of the rubber compound to the carbon black, physical properties can be improved.

U.S. Pat. No. 5,070,148 discloses a segmented elastomer which can be utilized in tire treads which offer good wet skid resistance, low rolling resistance, good tread wear characteristics and good abrasion resistance. The segmented elastomers disclosed in U.S. Pat. No. 5,070,148 are comprised of: (a) a first segment which is comprised of repeat units which are derived from isoprene having a microstructure wherein there are from about 75% to about 98% 1,4-linkages and from about 2% to about 25% 3,4-linkages and wherein the first segment has a number average molecular weight which is within the range of about 25,000 to about 350,000; and (b) a second segment which is comprised of repeat units which are derived from 30 to 95 weight percent 1,3-butadiene and from 5 to 70 weight percent styrene, wherein the sum of (1) the product of 1.7 and the weight percent of styrene in the second segment and (2) the percentage of 1,2-butadiene linkages in the second segment is within the range of about 50% to about 92%, and wherein the second segment has a number average molecular weight which is within the range of about 50,000 to about 350,000.

SUMMARY OF THE INVENTION

The high performance rubbery polymers of this invention have excellent properties for incorporation into the rubber compounds used in making tire treads. The rubbery polymers of this invention can be employed to improve the wet skid resistance and traction characteristics of tires without sacrificing tread wear or rolling resistance. A highly desirable combination of tire characteristics can be attained which cannot be achieved by utilizing conventional techniques. These improvements are believed to be attributable to the unique morphology associated with the rubbery polymers of this invention.

High performance rubbers of this invention are made by a two step polymerization process. In the first step of the process, 1,3-butadiene monomer and styrene are copolymerized utilizing a lithium initiator. This step is carried out in the substantial absence of polar modifiers. Due to differing rates of reactivity and the absence of polar modifiers, the first segment formed will be blocky with there being tapers between the blocks when the polymerization is conducted in a batch process. For instance, 1,3-butadiene has a rate of polymerization which is approximately twenty-four times faster than that of styrene. Accordingly, a first block which is comprised mostly of repeat units which are derived from 1,3-butadiene will be formed first with a second block which is comprised predominantly of repeat units which are derived from styrene being formed next. However, in cases where the polymerization is conducted in a continuous process where both the styrene and 1,3-butadiene monomer are continuously pumped into the reaction zone (polymerization reactor), the repeat units which are derived from styrene and butadiene will be essentially random in order. The amount of monomers utilized in the first step of the polymerization will be sufficient to produce a first segment which has a number average molecular weight which is within the range of about 25,000 to about 350,000.

The living polydiene segment produced in the first step of the polymerization is then utilized to initiate the copolymerization of 1,3-butadiene and styrene in the second step of the process of this invention. It is important for this step of the polymerization to be conducted in the presence of at least one polar modifier at a temperature which is within the range of about 40° C. to about 150° C. The polar modifier will normally be employed at a level which is sufficient to cause the repeat units in the final segment of the rubbery polymer to be in an essentially random order. The amount of monomers utilized will be sufficient for the final segment to have a number average molecular weight which is within the range of about 25,000 to about 350,000.

The subject invention more specifically reveals a rubber polymer which has an excellent combination of properties for use in making tire treads which is comprised of (a) a first segment which consists essentially of repeat units which are derived essentially from 1,3-butadiene and styrene monomer, wherein the first segment has a vinyl content which is within the range of about 6% to about 15%, and wherein the first segment has a number average molecular weight which is within the range of about 25,000 to about 350,000; and (b) a final segment which is comprised of repeat units which are derived from 1,3-butadiene and styrene, wherein the repeat units in the final segment are in essentially random order, wherein the final segment has a vinyl content of about 20% to about 95%, wherein the final segment has a number average molecular weight which is within the range of about 25,000 to about 350,000 and wherein the sum of (1) the product of 1.7 and the weight percent of styrene in the second segment and (2) the percentage of 1,2-linkages in the second segment is within the range of about 50% to about 92%.

The present invention also discloses a process for preparing a rubbery polymer which has an excellent combination of properties for use in making tire treads which comprises: (a) copolymerizing 1,3-butadiene monomer and styrene monomer with a lithium initiator in the substantial absence of polar modifiers at a temperature which is within the range of about 40° C. to about 150° C. to produce a living styrene-butadiene segment having a number average molecular weight which is within the range of about 25,000 to about 350,000; and (b) utilizing the living styrene-butadiene segment to initiate the copolymerization of 1,3-butadiene and styrene, wherein the copolymerization is conducted in the presence of at least one polar modifier at a temperature which is within the range of about 40° C. to about 150° C. to produce a final segment which is comprised of repeat units which are derived from 1,3-butadiene and styrene, wherein the final segment has a number average molecular weight which is within the range of about 25,000 to about 350,000, wherein the final segment has a vinyl content which is within the range of about 6% to about 15%, and wherein the sum of (1) the product of 1.7 and the weight percent of styrene in the second segment and (2) the percentage of 1,2-linkages in the second segment is within the range of about 50% to about 92%.

DETAILED DESCRIPTION OF THE INVENTION

In the first step of the process of this invention, 1,3-butadiene monomer and styrene monomer are copolymerized to a molecular weight which is within the range of about 25,000 to about 350,000. The polymerization is carried out in an inert organic medium utilizing a lithium catalyst. This polymerization step is carried out without employing a polar modifier. It is important to conduct this polymerization step in the absence of significant quantities of polar modifiers to attain the desired microstructure. For example, the repeat units which are derived from 1,3-butadiene will have a low vinyl microstructure within the range of about 6% to about 15% vinyl and preferably within the range of about 8% to about 10% vinyl.

The inert organic medium which is utilized as the solvent will typically be a hydrocarbon which is liquid at ambient temperatures which can be one or more aromatic, paraffinic or cycloparaffinic compounds. These solvents will normally contain from 4 to 10 carbon atoms per molecule and will be liquids under the conditions of the polymerization. It is, of course, important for the solvent selected to be inert. The term "inert" as used herein means that the solvent does not interfere with the polymerization reaction or react with the polymers made thereby. Some representative examples of suitable organic solvents include pentane, isooctane, cyclohexane, normal hexane, benzene, toluene, xylene, ethylbenzene and the like, alone or in admixture. Saturated aliphatic solvents, such as cyclohexane and normal hexane, are most preferred.

The lithium catalysts which can be used are typically organolithium compounds. Organo monolithium compounds, such as alkyllithium compounds and aryllithium compounds, are usually employed. Some representative examples of organo monolithium compounds that can be utilized include ethylaluminum, isopropylaluminum, n-butyllithium, secondary-butyllithium, normal-hexyllithium, tertiary-octyllithium, phenyllithium, 2-napthyllithium, 4-butylphenyllithium, 4-phenylbutyllithium, cyclohexyllithium, and the like. Normal-butyllithium and secondary-butyllithium are highly preferred lithium catalysts.

The amount of lithium catalyst utilized will vary from one organolithium compound to another and with the molecular weight that is desired for the first segment being synthesized. As a general rule, from about 0.01 phm (parts per hundred parts by weight of monomer) to 1 phm of the lithium catalyst will be employed. In most cases, from 0.01 phm to 0.1 phm of the lithium catalyst will be employed with it being preferred to utilize 0.025 phm to 0.07 phm of the lithium catalyst.

Normally, from about 5 weight percent to about 35 weight percent of the 1,3-butadiene and styrene monomers will be charged into the polymerization medium (based upon the total weight of the polymerization medium including the organic solvent and monomers). In most cases, it will be preferred for the polymerization medium to contain from about 10 weight percent to about 30 weight percent monomers. It is typically more preferred for the polymerization medium to contain from about 20 weight percent to about 25 weight percent monomers.

The 1,3 butadiene monomer and styrene monomer will be copolymerized at a temperature which is within the range of about 40° C. to about 150° C. The polymerization temperature will preferably be within the range of about 50° C. to about 120° C. to attain the desired microstructure for the first segment. Temperatures within the range of about 100° C. to about 80° C. are most preferred. The microstructure of the first polymeric segment being prepared is somewhat dependent upon the polymerization temperature. For instance, lower temperatures will cause a greater quantity of 1,2-microstructure. Styrene and 1,3-butadiene polymerize at different rates. This results in them sequentially adding to the segment based upon their rate of reactivity. In any case, because the diene monomers have a much faster rate of reactivity than styrene, the first segment of the rubbery polymer will be comprised of repeat units which are derived essentially from 1,3-butadiene monomers. Since styrene polymerizes at a much slower rate than 1,3-butadiene, there will be a block located between the first segment and the final segment which is comprised of repeat units which are derived essentially from the styrene monomer.

A combination of 1,3-butadiene and styrene is employed in making the first segment. Normally from about 5 to about 40 weight percent styrene and from about 60 to about 95 weight percent 1,3-butadiene will be used in making the first segment. It is generally preferred for the first segments to contain from about 10 to about 30 weight percent styrene and from about 70 to about 90 weight percent 1,3-butadiene.

The polymerization in the first step of the process is allowed to continue until essentially all of the monomers have been exhausted. In other words, the polymerization is allowed to run to completion. Since a lithium catalyst is employed to polymerize the conjugated diene monomer, a living polydiene segment is produced. Since styrene is included in the first polymerization step, a living polybutadiene segment having a styrene block at the end thereof will be produced. This living segment will have a number average molecular weight which is within the range of about 25,000 to about 350,000. It will preferably have a molecular weight which is within the range of about 50,000 to about 200,000 and will more preferably have a number average molecular weight which is within the range of about 70,000 to about 150,000.

The first segment will have a vinyl content with respect to the butadiene repeat units therein which is within the range of about 6% to about 15%. The first segment will preferably have a vinyl content which is within the range of about 8% to about 10%.

The second step in the process of this invention involves utilizing the living polydiene segment to initiate the copolymerization of 1,3-butadiene monomer and styrene monomer. This copolymerization is carried out in the presence of at least one polar modifier. Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like.

The modifier can also be a 1,2,3-trialkoxybenzene or a 1,2,4-trialkoxybenzene. Some representative examples of 1,2,3-trialkoxybenzenes that can be used include 1,2,3-trimethoxybenzene, 1,2,3-triethoxybenzene, 1,2,3-tributoxybenzene, 1,2,3-trihexoxybenzene, 4,5,6-trimethyl 1,2,3 trimethoxybenzene, 4,5,6-tri-n-pentyl 1,2,3-triethoxybenzene, 5-methyl-1,2,3-trimethoxybenzene, and 5-propyl 1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl 1,2,4-trimethoxybenzene, 5-propyl-1,2,4-trimethoxybenzene, and 3,5-dimethyl-1,2,4-trimethoxybenzene. Dipiperidinoethane, dipyrrolidinoethane, tetramethylethylene diamine, diethylene glycol, dimethyl ether and tetrahydrofuran are representative of highly preferred modifiers. U.S. Pat. No. 4,022,959 describes the use of ethers and tertiary amines as polar modifiers in greater detail.

The utilization of 1,2,3-trialkoxybenzenes and 1,2,4-trialkoxybenzenes as modifiers is described in greater detail in U.S. Pat. No. 4,696,986. The teachings of U.S. Pat. No. 4,022,959 and U.S. Pat. No. 4,696,986 are incorporated herein by reference in their entirety. The microstructure of the repeat units which are derived from conjugated diene monomers is a function of the polymerization temperature and the amount of polar modifier present. For example in the polymerization of 1,3-butadiene, it is known that higher temperatures result in lower vinyl contents (lower levels of 1,2-microstructure). Accordingly, the polymerization temperature, quantity of modifier and specific modifier selected will be determined with the ultimate desired microstructure of the polymer segment being synthesized being kept in mind.

In the second step of the process of this invention, the final polymeric segment is synthesized. This is typically carried out by adding the polar modifier, the 1,3-butadiene, and the styrene monomer to the medium containing the living polydiene segment made in the first step. This is accomplished by first adding the modifier to the medium containing the living polydiene segment and subsequently adding the styrene and 1,3-butadiene. Additional solvent can also be added, if necessary, to maintain the total amount of monomers and polymer within the polymerization medium within the range of about 5 to about 35 weight percent (based upon the total weight of the polymerization medium including monomers, polymer and solvent). It is desirable to add a sufficient amount of solvent so as to maintain the total amount of polymer and monomers within the range of about 10 to about 30 weight percent and preferably within the range of about 20 to about 25 weight percent, based upon the total weight of the reaction medium.

The repeat units in the final segment are, of course, derived from 1,3-butadiene and styrene. The final segment will typically be comprised of from about 5 weight percent to about 40 weight percent repeat units which are derived from styrene and from about 60 weight percent to about 95 weight percent repeat units which are derived from 1,3-butadiene. It is normally preferred for the final segment to contain from about 10 weight percent to about 30 weight percent repeat units which are derived from styrene, and from about 70 weight percent to about 90 weight percent repeat units which are derived from 1,3-butadiene. It is most preferred for the final segment to contain from about 20 weight percent to about 25 weight percent repeat units which are derived from styrene and from about 75 weight percent to about 80 weight percent repeat units which are derived from 1,3 butadiene.

In the second segment, the distribution of repeat units derived from styrene and butadiene is essentially random. The term "random" as used herein means lacking a definite pattern. As a general rule, less than 1% of the total quantity of repeat units derived from styrene are in blocks containing four or more styrene repeat units. In other words, more than 99% of the repeat units derived from styrene are in blocks containing less than three styrene repeat units. A large quantity of repeat units derived from styrene will, of course, be in blocks containing one styrene repeat unit. Such blocks containing one styrene repeat unit are bound on both sides by repeat units which are derived from 1,3-butadiene.

The copolymerization of butadiene and styrene can be conducted at the same temperature which is used in the synthesis of the first segment. However, this copolymerization will be carried out at a temperature which is within the range of about 40° C. to about 150° C. The copolymerization will preferably be conducted at a temperature which is within the range of about 50° C. to about 120° C. and will most preferably be conducted at a temperature which is within the range of 60° C. to 100° C.

The second polymerization step is normally allowed to continue until the monomers are exhausted. In other words, the copolymerization is allowed to continue until the polymerization reaction is complete. A sufficient quantity of monomers will be utilized to attain a number average molecular weight for the final segment which is within the range of about 25,000 to about 350,000. It is normally preferred for the second segment to have a number average molecular weight which is within the range of 50,000 to 200,000 with number average molecular weights within the range of 70,000 to 150,000 being most preferred.

The second segment will have a vinyl content with respect to the butadiene repeat units therein which is within the range of about 20% to about 95%. The second segment will preferably have a vinyl content which is within the range of 40% to 80%. It is also important for the second segment to be prepared in a manner whereby the sum of (1) the product of 1.7 and the weight percent of styrene in the second segment and (2) the percentage of 1,2-butadiene linkages in the second segment is within the range of about 50% to about 92%. For example, if the second segment contains 10% bound styrene, it would need to have a 1,2-microstructure (vinyl content) within the range of 45% to 83%. In the event that the second segment contains 40% bound styrene, then the percentage of 1,2-butadiene linkages in the second segment would of necessity be 55% or less. it is preferred for the sum of (1) the product of 1.7 and the weight percent of styrene in the second segment and (2) the percentage of 1,2-butadiene linkages in the second segment to be within the range of about 70% to about 90%. It is most preferred for the sum of (1) the product of 1.7 and the weight percent of styrene in the second segment and (2) the percentage of 1,2 butadiene linkages in the second segment to be within the range of about 75% to about 85%.

The ratio of the number average molecular weight of the first segment to the number average molecular weight of the final segment will typically be within the range of about 25/75 to about 75/25. This ratio plays a role in determining the morphology of the polymer and will usually be within the range of about 35/65 to about 65/35. The Mooney ML (1+4) viscosity of the segmented rubbery polymers of this invention will generally be greater than about 65 and less than about 100. It is normally preferred for the Mooney ML (1+4) viscosity of the rubbery polymer to be within the range of 70 to 85 with Mooney ML (1+4) viscosities within the range of 75 to 80 being most preferred.

After the copolymerization has been completed, the segmented rubbery polymer can be recovered from the organic solvent. The segmented rubbery polymer can be recovered from the organic solvent and residue by any means, such as decantation, filtration, centrification and the like. It is often desirable to precipitate the segmented rubber from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the segmented polymer from the polymer cement also "kills" the living polymer by inactivating lithium end groups. After the segmented polymer is recovered from the solution, steam stripping can be employed to reduce the level of volatile organic compounds in the segmented polymer.

There are valuable benefits associated with utilizing the segmented rubbery polymers of this invention in making tire tread compounds. Tire tread compounds can be made using these segmented polymers without the need to blend additional rubbers therein. However, in many cases, it will be desirable to blend the segmented elastomer with one or more additional rubbers to attain the desired performance characteristics for the tire tread compound. For instance, the segmented rubber can be blended with natural rubber to make tread compounds for passenger tires which exhibit outstanding rolling resistance, traction and tread wear characteristics. Such blends will normally contain from about 5 to about 40 weight percent natural rubber and from about 60 to about 95% of the segmented elastomer. High performance tires which exhibit very exceptional traction characteristics, but somewhat comprised tread wear, can be prepared by blending the segmented elastomer with solution or emulsion styrene-butadiene rubber (SBR). In cases where tread wear is of greater importance than traction, high cis-1,4-polybutadiene can be substituted for the SBR. In any case, the segmented rubbers of this invention can be used to improve the traction, tread wear and rolling resistance of tires made therewith.

This invention is illustrated by the following examples which are merely for the purpose of illustration and are not to be regarded as limiting the scope of the invention or the manner in which it can be practiced. Unless specifically indicated otherwise, all parts and percentages are given by weight.

EXAMPLE 1

The segmented polymer prepared in this experiment was synthesized in a five gallon (19 liters) batch polymerization reactor. In the first step of the synthesis, 5 kg of a premix containing styrene and 1,3-butadiene in hexane was charged into the polymerization reactor. The premix monomer solution contained a ratio of styrene to 13,-butadiene of 18:82 and the total monomer concentration was 19.1%. The monomer premix solution has been previously scavenged for impurities with a n-butyllithium solution. Polymerization was initiated by the addition of 7.50 ml of a 1.02M solution of n-butyllithium. The reactor was maintained at a temperature of about 65° C. until essentially complete monomer conversion had been achieved which took two and a half hours.

In the second step of the process, 4.61 ml of a 6.63M solution of N,N,N',N'-tetramethylethylene-diamine (TMEDA) was added as a modifier to the reactor followed by the addition of 5 kg of a styrene/1,3-butadiene in hexane solution. The styrene/butadiene solution had been scavenged with n-butyllithium and had a ratio of styrene to butadiene of 18:82. The styrene/butadiene solution contained 19.1% monomers. The polymerization was carried out at a temperature of 65° C. until all of the monomers had been consumed which took 2 hours. The polymerization medium was then short-stopped with ethanol and the polymer was stabilized with 1 phr (parts per hundred parts of rubber) of an antioxidant. The segmented polymer which was recovered was subsequently dried in a vacuum oven which was maintained at 50° C.

The segmented elastomer which was recovered weighed 1.9 kg and displayed a broad glass transition temperature (Tg) at −75° C. As indicated by NMR measurement, styrene in the recovered elastomer was blocky in the first SBR segment and was random in the second SBR segment. The microstructure of the segmented polymer prepared is shown in Table I.

EXAMPLES 2-4

The procedure described in Example 1 was utilized in these examples except that the polymerizations were conducted continuously at 90° C. in two 5.2 liter reactors. 2,2-ditetrahydrofuryl propane (DTP) was used as the modifier and premixes containing a ratio of styrene to 1,3-butadiene of 12:88, 22:78, and 30:70 were employed. These segmented polymers were prepared by polymerizing the first half of the styrene/butadiene monomers to completion in the first reactor at 90° C. with n-butyllithium. The resulting polymerization medium containing the live ends was continuously pushed into the second reactor where the modifier and the second half of the styrene/butadiene monomers were added. The polymerization was carried out at 90° C. until all the monomers had been consumed. The residence time for both reactors was set at two hours to achieve complete monomer conversions in both reactors. The polymerization medium was then continuously pushed over to a holding tank containing the shortstop (ethanol) and an antioxidant. The resulting polymer cement was then steam stripped and the recovered segmented polymers were dried in a vacuum oven at 50° C. The styrene distribution in both SBR segments of these segmented elastomers was random since the styrene and butadiene monomers were continuously pumped into the reactors. The three segmented polymers synthesized in these experiments also displayed a broad glass transition temperature which was within −71° C. to −52° C. The microstructure of the segmented polymers prepared is also shown in Table I.

TABLE I

| Example | Pzm. Temp. | Tg (°C.) | Sty/Bd Comp. | ML-4 | Microstructure 1,2-PBd | Microstructure 1,4-PBd | Styrene Block | Styrene Random |
|---|---|---|---|---|---|---|---|---|
| 1 | 65° C. | −75 | 18/82 | 90 | 28 | 54 | 7 | 11 |
| 2 | 90° C. | −71 | 12/88 | 88 | 28 | 60 | 0 | 12 |
| 3 | 90° C. | −65 | 22/78 | 84 | 24 | 54 | 0 | 22 |
| 4 | 90° C. | −52 | 30/70 | 55 | 22 | 48 | 0 | 30 |

COMPARATIVE EXAMPLE 5

A styrene-butadiene copolymer contained a ratio of styrene to butadiene of 18:82 was also prepared as a control polymer to compare its compounded properties with those of the segmented elastomers prepared in examples 1–4.

The copolymer synthesized in this example was carried out in a five gallon (19 liter) continuous system utilizing a standard anionic polymerization technique. n-Butyllithium modifier (TMEDA) and premix monomer solution contained a ratio of styrene to butadiene of 18:82 were continuously pumped into the reactor. The polymerization was carried out at 90° C. until all of the monomers had been consumed at a residence time of 3 hours. The polymer was then recovered similarly as described in Examples 2–4. The styrene-butadiene recovered in this experiment displayed a glass transition temperature at −75° C. The polymer was also determined to have a ML-4 of 90.

The segmented polymers and the control styrene-butadiene copolymer which were recovered were then compounded utilizing a standard formulation which included carbon black, sulfur, natural rubber and an accelerator. The natural rubber was included in the blend at a 1:2 ratio to the segmented polymer or the control copolymer. The viscoelastic properties of these cured blends is reported in Table II.

TABLE II

| Example | Tan Delta at 0° C. | Tan Delta at 60° C. |
|---|---|---|
| 1 | 0.213 | 0.075 |
| 2 | 0.201 | 0.070 |
| 3 | 0.253 | 0.076 |
| 4 | 0.240 | 0.096 |
| 5 | 0.187 | 0.090 |

Variations in the present invention are possible in light of the description of it provided herein. It is, therefore, to be understood that changes can be made in the particular embodiments described which will be within the full intended scope of the invention as defined by the following appended claims.

What is claimed is:

1. A rubber polymer which has an excellent, combination of properties for use in making tire treads which is comprised of (a) a first segment which consists essentially of repeat units which are derived essentially from 1,3-butadiene and styrene monomer, wherein the first segment has a vinyl content which is within the range of about 6% to about 15%, and wherein the first segment has a number average molecular weight which is within the range of about 25,000 to about 350,000; and (b) a final segment which is comprised of repeat units which are derived from 1,3-butadiene and styrene, wherein the repeat units in the final segment are in essentially random order, wherein the final segment has a vinyl content of about 20% to about 95%, wherein the final segment has a number average molecular weight which is within the range of about 25,000 to about 350,000 and wherein the sum of (1) the product of 1.7 and the weight percent of styrene in the second segment and (2) the percentage of 1,2-linkages in the second segment is within the range of about 50% to about 92%.

2. A rubbery polymer as specified in claim 1 wherein the final segment is comprised of repeat units which are derived from about 60 to about 95 weight percent 1,3-butadiene and from about 5 to about 40 weight percent styrene.

3. A rubbery polymer as specified in claim 1 wherein the final segment is comprised of repeat units which are derived from about 70 to about 90 weight percent 1,3-butadiene and from about 10 to about 30 weight percent styrene.

4. A rubbery polymer as specified in claim 2 wherein the Mooney ML (1+4) viscosity of the rubbery polymer is within the range of about 70 to about 85.

5. A rubbery polymer as specified in claim 1 wherein the number average molecular weight of the first segment is within the range of about 50,000 to about 200,000 and wherein the number average molecular weight of the final segment is within the range of about 50,000 to about 200,000.

6. A rubbery polymer as specified in claim 2 wherein the number average molecular weight of the first segment is within the range of about 70,000 to about 150,000 and wherein the number average molecular weight of the vinyl segment is within the range of about 70,000 to about 150,000.

7. A rubbery polymer as specified in claim 6 wherein the rubbery polymer has a Mooney ML (1+4) viscosity which is within the range of about 75 to about 80.

8. A rubbery polymer as specified in claim 2 wherein the sum of (1) the product of 1.7 and the weight percent of styrene in the second segment and (2) the percentage of 1,2-linkages in the second segment is within the range of about 70% to about 90%.

9. A rubbery polymer as specified in claim 3 wherein the sum of (1) the product of 1.7 and the weight percent of styrene in the second segment and (2) the percentage of 1,2-linkages in the second segment is within the range of about 75% to about 85%.

10. A process for preparing a rubbery polymer which has an excellent combination of properties for use in making tire treads which comprises: (a) copolymerizing 1,3-butadiene monomer and styrene monomer with a lithium initiator in the substantial absence of polar modifiers at a temperature which is within the range of about 40° C. to about 150° C. to produce a living styrene-butadiene segment having a number average molecular weight which is within the range of about 25,000 to about 350,000; and (b) utilizing the living styrene-butadiene segment to initiate the copolymerization of 1,3-butadiene and styrene, wherein the copolymerization is conducted in the presence of at least one polar modifier at a temperature which is within the range of about 40° C. to about 150° C. to produce a final segment which is comprised of repeat units which are derived from 1,3-butadiene and styrene, wherein the final segment has a number average molecular weight which is within the range of about 25,000 to about 350,000, wherein the final segment has a vinyl content which is within the range of about 6% to about 15%, and wherein the sum of (1) the product of 1.7 and the weight percent of styrene in the second segment and (2) the percentage of 1,2-linkages in the second segment is within the range of about 50% to about 92%.

11. A process as specified in claim 10 wherein the copolymerization of step (b) is conducted at a temperature which is within the range of about 50° C. to about 120° C.

12. A process as specified in claim 10 wherein the copolymerization of step (b) is carried out at a temperature which is within the range of about 60° C. to about 100° C.

13. A process as specified in claim 11 wherein the monomers copolymerized in step (b) are comprised of from 60 to 95 weight percent 1,3-butadiene and from 5 to 40 weight percent styrene.

14. A process as specified in claim 12 wherein the monomers copolymerized in step (b) are comprised of from about 70 to about 90 weight percent 1,3-butadiene and from about 10 to about 30 weight percent styrene.

15. A rubbery polymer as specified in claim 6 wherein the first segment consists of repeat units which are derived from 1,3-butadiene and wherein the rubbery polymer has a Mooney ML (1+4) viscosity which is within the range of about 70 to about 85.

* * * * *